(No Model.)
C. O. CASE.
METHOD OF MAKING SASH CORD PULLEYS.
No. 414,972. Patented Nov. 12, 1889.
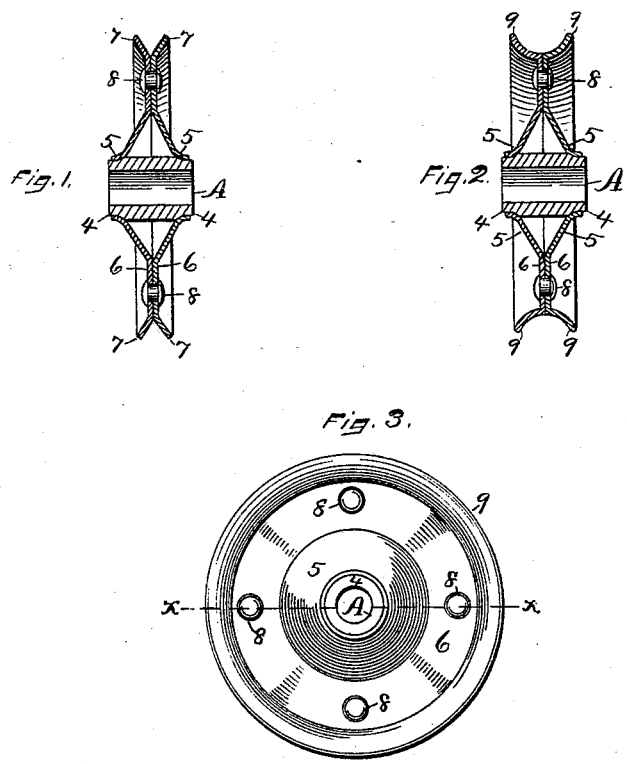
Witnesses.
John Edwards Jr.
Inventor.
Cromwell O. Case.
By James Shepard
Atty.

UNITED STATES PATENT OFFICE.

CROMWELL O. CASE, OF NEW BRITAIN, CONNECTICUT, ASSIGNOR TO P. & F. CORBIN, OF SAME PLACE.

METHOD OF MAKING SASH-CORD PULLEYS.

SPECIFICATION forming part of Letters Patent No. 414,972, dated November 12, 1889.

Application filed May 16, 1889. Serial No. 310,967. (No model.)

*To all whom it may concern:*

Be it known that I, CROMWELL O. CASE, a citizen of the United States, residing at New Britain, in the county of Hartford and State of Connecticut, have invented certain new and useful Improvements in the Manufacture of Sash-Cord Pulleys, of which the following is a specification.

My invention relates to improvements in the manufacture of sash-cord pulleys or pulleys for analogous use; and the objects of my invention are to produce a light, neat, and substantial pulley at a small cost.

In the accompanying drawings, Figure 1 is a sectional view of my sash-cord pulley in an incomplete form. Fig. 2 is a like view of the finished pulley, and Fig. 3 is a side elevation, the plane of section in Figs. 1 and 2 being indicated by the line $x$ $x$ in Fig. 3, the rivets being shown in elevation.

In making my pulley I provide a solid hub having an axial hole, and at each end a reduced portion or tenon 4 4. I also provide two sides struck up from sheet metal, each having a central hub 5, the opening in which is of a size to snugly fit the reduced portion or tenon 4 of the hub A. Outside of the central hub 5 is a flat annular portion 6, and outside of said flat annular portion I form the projecting flange 7, Fig. 1. These two sheet-metal sides are placed together with the hub in their respective openings, and the parts are firmly secured together by rivets 8, being then in the form illustrated in Fig. 1, thereby forming the body portion of a pulley with a split or divided rim. I next spin or form the flanges 7 7 of the divided rim in a lathe or other special machine into the desired form for the finished peripheral flanges 9 9 shown in Figs. 2 and 3, and at the same time by forming the periphery by spinning it is neatly burnished and the joint between the two parts made so solid and close as to be practically imperceptible.

By my improvement a light, neat, and substantial pulley is produced at a small cost.

I claim as my invention—

The method of making sheet-metal pulleys, which consists in part of forming the body portion of the pulley with a split or divided rim and then spinning or forming the flanges of said divided rim in a lathe or other special machine into the desired form for the finished peripheral flanges, substantially as described, and for the purpose specified.

CROMWELL O. CASE.

Witnesses:
W. N. ABBY,
CHARLES F. CORBIN.